(12) United States Patent
Onaka et al.

(10) Patent No.: US 7,606,504 B2
(45) Date of Patent: Oct. 20, 2009

(54) OPTICAL RECEIVER AND OPTICAL RECEIVING METHOD CORRESPONDING TO DIFFERENTIAL M-PHASE SHIFT KEYING SYSTEM

(75) Inventors: Hiroshi Onaka, Kawasaki (JP); Takeshi Hoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 500 days.

(21) Appl. No.: 11/397,690

(22) Filed: Apr. 5, 2006

(65) Prior Publication Data
US 2006/0280510 A1 Dec. 14, 2006

(30) Foreign Application Priority Data
Apr. 6, 2005 (JP) .............................. 2005-110103

(51) Int. Cl.
*H04B 10/06* (2006.01)
*G02F 2/00* (2006.01)
(52) U.S. Cl. .................. 398/214; 398/202; 398/208; 398/212; 359/325; 359/577; 359/583
(58) Field of Classification Search ................. 398/202, 398/208, 212, 214; 356/477; 359/325, 577, 359/583; 385/14, 129, 130, 131, 132
See application file for complete search history.

(56) References Cited
U.S. PATENT DOCUMENTS
2005/0286911 A1* 12/2005 Doerr et al. ................. 398/214
2006/0056845 A1 3/2006 Parsons et al.

FOREIGN PATENT DOCUMENTS
GB 2285144 8/2003
WO WO 03/063515 A2 * 7/2003

OTHER PUBLICATIONS

Kim et al., "Robustness to Laser Frequency Offset in Direct-Detection DPSK and DQPSK Systems", Sep. 2003, Journal of Lightwave Tech., vol. 21, No. 9, pp. 1887-1891.*
"High Sensitivity Optically Preamplified Direct Detection DPSK Receiver with Active Delay-Line Stabilization," IEEE Photonics Technology Letters, vol. 6, No. 2; Feb. 1994; p. 1-3.
British Search Report; dated Jul. 26, 2006.

\* cited by examiner

Primary Examiner—Ken N Vanderpuye
Assistant Examiner—Daniel G Dobson
(74) Attorney, Agent, or Firm—Staas & Halsey LLP

(57) ABSTRACT

An optical receiver comprises branching units for branching and supplying the signal lights to be inputted to the first to fourth optical waveguides provided on a substrate, second to third optical waveguides for giving delay time differences corresponding to a symbol of the DMPSK modulated signal, a demodulating unit for demodulating two light signals through interference of signal lights between the first to second optical waveguides and between the third to fourth optical waveguides, two optical detectors for converting two light signals from the demodulating unit, and a light path length varying unit for identically varying each light path length of two optical waveguides being arranged through selection of combinations of the first and third optical waveguides, the first and fourth optical waveguides, and the second and third optical waveguides in one region when the wavelength of the signal light is varied.

14 Claims, 10 Drawing Sheets

EXAMPLE OF PRIOR ART STRUCTURE OF DQPSK OPTICAL TRANSMITTER

EXAMPLE OF BACKGROUND ART STRUCTURE OF DQPSK OPTICAL RECEIVER

OPTICAL RECEIVER AND OPTICAL RECEIVING METHOD CORRESPONDING TO DIFFERENTIAL M-PHASE SHIFT KEYING SYSTEM

FIELD OF THE INVENTION

The present invention relates to an optical receiver and an optical receiving method for demodulating the signal light of the differential M-phase shift keying and particularly to a technique for realizing a small size optical receiver of the DQPSK ensuring stable operation.

BACKGROUND OF THE INVENTION

In recent years, attention has been paid, for example, to the optical modulation system such as the differential binary phase shift keying (DBPSK or DPSK) or the differential quadrature phase shift keying (DQPSK) as the technique for enabling high bit rate optical transmission of 40 Gb/s or more per wavelength.

As the requirement of the optical modulation system in the photonic network corresponding to high bit rate, it is expected to have the excellent characteristics for the technical items listed up, for example, in regard to optical noise tolerance, chromatic dispersion tolerance, polarization mode dispersion (PMD) tolerance, optical non-linear tolerance, OADM filter passing tolerance and transceiver size/cost or the like. Particularly, the system ensuring optical noise tolerance and chromatic dispersion tolerance can be said to be more suitable for long-range optical communication. Moreover, the DQPSK system explained above has been verified, from the result of simulation or the like, to show more excellent characteristics in regard to many factors of the technical elements listed up in comparison with the well known ordinary non-return-to-zero (NRZ) modulation, carrier-suppressed return-to-zero (CS-RZ) modulation system, and DPSK modulation system.

As a practical example, FIG. 6 illustrates a comparison result in each modulation system of the optical noise tolerance, chromatic dispersion tolerance and PMD tolerance in regard to the optical modulation system of NRZ, Duo-binary, CS-RZ, RZ-DPSK, and RZ-DQPSK. Moreover, FIG. 7 illustrates simulation result in regard to the passing tolerance of wavelength combining/branching filters (for example, OADM).

The DQPSK modulation system in this specification is assumed to include the RZ-DQPSK system in which the DQPSK signal is converted to the return-to-zero (RZ) pulse in its intensity waveform and the carrier-suppressed (CS) RZ-DQPSK system. Moreover, the technique disclosed in this specification can be adapted to the differential M-phase shift keying system including the DMPSK (differential M-phase shift keying (M=2n)) such as D8PSK and the like.

Here, an optical transmitter and an optical receiver introducing the DQPSK system will be explained briefly.

As the optical transmitter introducing the DQPSK system, the optical transmitter having the basic structure illustrated, for example, in FIG. 8 is known (for example, JP-A No. 2004-516743). In this optical transmitter, a continuous light emitted from a light source 500 is branched into two light and a branched light is applied to a phase modulator (PM) 510, while the other branched light to a phase modulator (PM) 513 via a delay unit 512. Each phase modulator 510, 513 is independently driven in accordance with the modulation signal generated by processing different data signals D1, D2 with the process in a pre-coder (integrator) 531 in order to selectively change the phase of each input light by 0 or π [radian]. Details of pre-coder and modulation are explained in the JP-A No. 2004-516743. Since the input light to the phase modulator 513 is given a phase difference as much as odd number times of π/2 by the delay unit 512 using the light delaying device for the input light to the phase modulator 510, an output light from the phase modulator 510 becomes the light signal obtained by modulating the light from the light source 500 through phase shift of π/2 or 3π/2. Since the output lights of the phase modulators 510, 513 are combined, the DQPSK signal light which changes in the phases of four values of π/4, 3π/4, 5π/4, 7π/4 can be generated. Since a bit rate of this DQPSK signal light becomes two times the bit rate of each data signal D1 or, D2, it is enough, for transmission of the DQPSK signal light, for example, of 40 Gb/s, to process the data signals D1, D2 of 20 Gb/s with the pre-coder and drive each phase modulator 510, 513.

Moreover, as illustrated in an example of structure, for example, of FIG. 8, the RZ-DQPSK signal light is generated by giving the DQPSK signal light to an intensity modulator 540 which is driven with the clock signal CLK synchronized with the data signals D1, D2 in order to obtain the RZ pulse, while the CSRZ-DQPSK signal light in the duty ratio of about 67% can be generated by setting the frequency of the clock signal CLK to ½ of the data signals D1, D2 and the amplitude thereof to a half-wavelength voltage (Vπ) of the intensity modulator 540. Light intensity and phase of the RZ-DQPSK signal have the relationship illustrated, for example, in FIG. 9. In the Figure, light intensity changes periodically as a result of the RZ modulation with CLK, whereas light intensity becomes constant when only the DQPSK modulation is carried out in FIG. 8.

As an optical receiver of the background art for demodulating the DQPSK signal light, a receiver in the structure, for example, as illustrated in FIG. 10 is known (for example, refer to JP-A No. 2004-516743). In this optical receiver, the input DQPSK signal light is branched into two signal lights. Each branched light is respectively given to delay interferometers 501, 502. The delay interferometers 501, 502 are structured to generate a relative delay time difference corresponding to approximately a symbol duration of the DQPSK-modulated code between the signal lights propagated in each arm by giving difference in the length of optical paths of two arms of a Mach-Zehnder type optical waveguide formed, for example, on a silica substrate or indium phosphate substrate. Moreover, an interference operating point of the delay interferometer 501 is set to π/4 with the delay unit 503 formed on an arm, while the interference operating point of the delay interferometer 502 is set to −π/4 with the delay unit 503 formed on the other arm. Complementary two outputs outputted from an output coupler of the delay interferometer 501 are received with a differential receiving circuit 505 formed of a pair of optical detectors and an electric amplifier and thereby an electrical signal A corresponding to the signal D1 inputted to the transmitter is demodulated. Moreover, in the similar manner, complementary two outputs outputted from an output coupler of the delay interferometer 502 are also received with a differential receiving circuit 506 formed of a pair of optical detectors and an electric amplifier and thereby, an electrical signal B corresponding to the signal D2 inputted to the transmitter is generated through demodulation. The electric signals A/B are regenerated as stable electric signals by CDR (clock and data recovery) circuits and are thereafter subjected to the frame synchronization processes such as SDH/SONET/OTN or the like, regeneration of frame by a framer circuit and error correction by an FEC decoder circuit.

Moreover, the delay interferometers used for the optical receiver of the background art is also known in the structure combining, for example, fused optical fiber couplers in addition to the structure of optical waveguide type.

In addition, see A. H. Gnauck et al., "Spectrally Efficient (0.8 b/s/Hz) 1-Tb/s (25×42.7 Gb/s) RZ-DQPSK Transmission Over 28 100-km SSMF Spans With 7 Optical Add/Drops", ECOC2004, PD.4.4.1

However, the optical receiver of the background art as illustrated in FIG. 10 has a problem that two delay interferometers including rather long optical paths for delaying the time of a symbol must be provided and thereby the optical receiver tend to be large in size. More specifically, for demodulation of the DQPSK signal light, for example, of 40 Gb/s, a delay time difference of about 50 ps corresponding to a symbol of the data signal of 20 Gb/s must be generated within each delay interferometer and it is therefore required to provide difference in the light path of about 15 mm between the arms. In the case where such delay interferometer is realized with an optical waveguide formed on the silica substrate or the like, a pair of optical waveguide circuits of large area must be allocated and therefore it is impossible to avoid enlargement of the optical receiver. Moreover, in the optical receiver of the background art, since the interference operating point (i.e. optical phase) of one delay interferometer must be set accurately to $\pi/4$, while the operating point of the other delay interferometer must be set, also accurately, to $-\pi/4$, here rises also a problem that a technology is required to control optical phase with high accuracy between the delay interferometers.

Here rises a problem also that since one operating point exists substantially for the interference, the technique for realizing a multirate optical receiver of the differential M-phase shift keying in different transmission rates is required.

SUMMARY OF THE INVENTION

The present invention has been proposed by placing the focus to the point explained above. It is therefore an object of the present invention to provide a small size and low cost optical receiver which can demodulate stably the signal light in accordance with the differential M-phase shift keying (DMPSK) system.

Another object of the present invention is to provide a multirate optical receiving apparatus which realizes reception of signal lights of different communication rates with different transmission systems.

According to the optical receiver of the present invention, since the process of the differential M-phase shift keying signal light which has been conducted in the background art by allocating the delay interferometers of two systems on the two substrates is in turn realized in the present invention by allocating the delay interferometer of each system on one substrate, it is possible in the present invention to provide a small size and stable optical receiver even when the light wavelength of the receiving signal varies. Moreover, it is also possible to provide an optical receiver which can receive the multirate signal lights in the stabilized signal quality.

In view of achieving the objects explained above, the optical receiving apparatus of the present invention is an optical receiving apparatus comprising a branching unit for supplying almost equal powers branched from the signal lights inputted to first to fourth optical waveguides provided on a substrate, second to third optical waveguides for giving relative delay time differences corresponding to a symbol duration of the differential M-phase shift keying modulated signal, a demodulating unit for demodulating at least two light signals through interference of signal lights between the first to second optical waveguides and between the third to fourth optical waveguides, at least two light detectors for converting at least two light signals from the demodulating unit, and a light path length varying unit for identically varying each light path length of two optical waveguides being arranged through selection of combinations of the first and third optical waveguides, the first and fourth optical waveguides, and the second and third optical waveguides in one region when the wavelength of the signal light is varied.

The second and third optical waveguides may be arranged symmetrically or asymmetrically to pass under the light path length varying unit.

The first and fourth light paths are arranged to pass the light path length varying unit as the optical waveguides which are not given the relative delay time difference corresponding to a symbol duration.

Moreover, the branching unit is a multiple mode interference coupler.

Moreover, the second and the third light paths arranged within the light path length varying unit are light paths which are given relative delay time difference corresponding to a symbol duration and are arranged resulting in opposing passing direction of signal lights under the light path length varying unit.

Moreover, the second and third light paths arranged within the light path length varying unit are light paths which are given relative delay time difference corresponding to a symbol duration and are arranged resulting in opposite crossing in the passing direction of each signal light under the light path length varying unit.

Moreover, the first and fourth light paths arranged in the light path length varying unit are light paths which are not given relative delay time difference corresponding to a symbol duration and are arranged passing under the light path length varying unit.

Moreover, the second and third light paths arranged in the light path length varying unit are light paths which are given relative delay time difference corresponding to a symbol duration and are arranged passing on a curve the light path length varying unit.

Moreover, the light path length varying unit includes the first and third light paths or the second and fourth light paths arranged which are optical waveguides given relative delay time difference according to a symbol of the modulated signal and not given such relative delay time difference and are arranged passing under the light path length varying unit.

Moreover, an optical receiving apparatus comprising a branching unit for supplying signal lights of almost equal power obtained by branching an input light, a delay adjusting unit for giving relative delay time difference according to a symbol of the differential M-phase shift keying modulated signal to a first signal light and a fourth signal light, a demodulating unit for demodulating at least two light signals through interference of respective signal lights of the first and second signal lights and the third and fourth signal lights, and at least two light detectors for converting said at least two light signals from said demodulating unit into electrical signals, wherein, the operating points of two delay interferometers in the delay adjusting unit are set within the range where relative delay time difference corresponding to a symbol duration of the input light wavelength is deteriorated in the receiving sensitivity of −0.2 dB from the center of the minimum and maximum communication rates of multirate.

BRIEF DESCRIPTION OF THE DRAWINGS

The best mode for carrying out the present invention will be explained with reference to the accompanying drawings. The like or corresponding elements are designated with the like reference numerals throughout the drawings.

DETAILED DESCRIPTION

The best mode for carrying out the present invention will be explained with reference to the accompanying drawings.

The first to third embodiments explained below are examples where the delay interferometers of two systems are allocated on one substrate.

Figure 1:
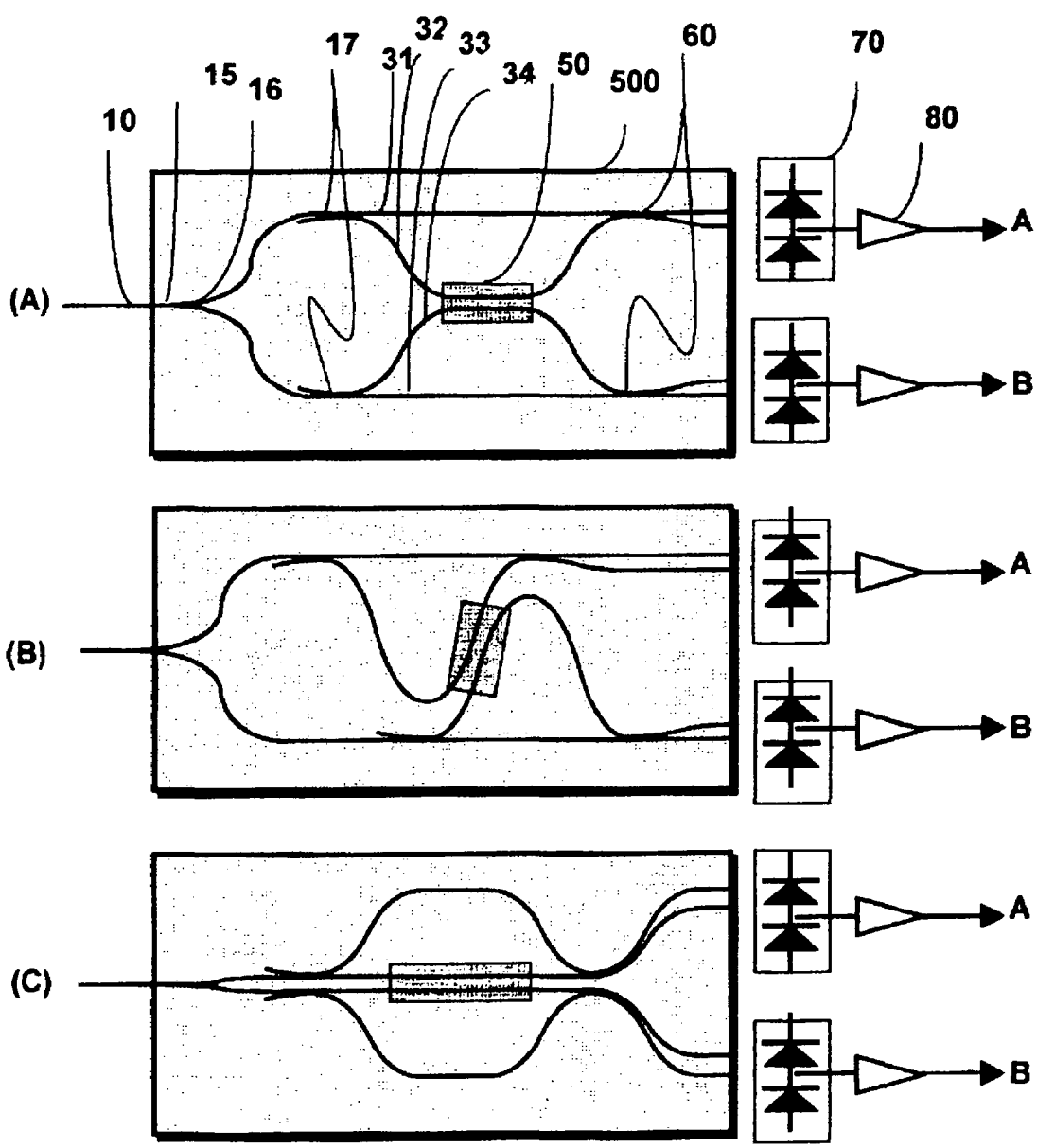
FIG. 1 are diagrams illustrating basic structures of an optical receiving apparatus as the first to third embodiment of the present invention.

FIG. 1 includes diagrams illustrating the first to third embodiments.

First Embodiment

FIG. 1(A) is a block diagram illustrating a basic structure of an optical receiver as a first embodiment of the present invention. First, the basic structure will be explained with inclusion of each principal portion. In this Figure, the reference numeral 500 is a silica substrate or indium phosphide substrate. The delay interferometers for two systems are integrated on one planar lightwave circuit (PLC) for reduction in size. Numeral 10 denotes a single mode fiber; 15, an optical waveguide; 16, 17, light branching units formed of a light directional coupler for almost equally branching the input DQPSK signal into two signal lights; 31 to 34, optical waveguides where the four signal lights having almost equal power are branched with the light branching units 16, 17 to the optical waveguides 31 to 34; 50, a light path length varying unit which is formed, for example, of a thin film heater for varying temperature in regard to the equal length of a part of the optical waveguides 32, 34. Here, the Pertier element may be substituted for the thin film heater. In this case, however, it is recommended to allocate the Pertier element at the lower side of the substrate and then control temperature of the substrate as a whole. Moreover, it is also possible that at least a pair of electrodes, for example, are provided to allow the optical waveguide to pass through the electric field generated. In such a structure, the electric field is generated when a voltage is applied to the electrode and moreover a refractive index of the optical waveguide varies due to this electric field. Therefore, the operation and effect similar to that of the thin film heater may be obtained.

Numeral 60 denotes a demodulating unit for demodulating the DQPSK modulated signal light as the intensity modulated light signal through delay interference of two signal lights from a pair of optical waveguides based on the directional coupling of two pairs of optical waveguides 31,32 and 33, 34. Namely, the demodulating unit can be formed by the directional coupling of the two optical waveguides.

Numeral 70 denotes a photoelectric converting unit formed of a differential light detecting circuit. The differential light detecting circuit receives the complementary two light signals from the demodulating unit 60 and outputs the electrical signals. Only one of the complementary two signal lights can also be received. In such detecting method, signal quality is likely to be deteriorated but cost reduction may be realized.

Numeral 80 denotes an amplifier for amplifying the electrical signals from the photoelectric converting unit. The optical receiving apparatus of this embodiment of the present invention is constituted as explained above.

Next, operations of the optical receiver will be explained with reference to FIG. 1.

Two sets of the delay interferometers are formed on the substrate 500. That is, a first delay interferometer is formed of a light branching unit 17, optical waveguides 31, 32 and an optical coupler 60, while a second delay interferometer is formed of a light branching unit 17, optical waveguides 33,34 and the optical coupler 60. These optical waveguides 32, 34 are set in the length thereof to give relative delay time difference corresponding to a symbol duration of the DQPSK modulated signal in each optical coupler 60. The optical waveguide 32 is set in the length thereof to give the phase difference of $+\pi/4$ of light signal wavelength to the light signal of the optical waveguide 31 in the optical coupler 60.

Moreover, the optical waveguide 34 is set in the length thereof to give the phase difference of $-\pi/4$ of light signal wavelength to the light signal of the optical waveguide 33 in the optical coupler 60. Namely, the light path length of the waveguide is set to provide the odd number times of $\pi/2$ as relative phase difference between the light signals of the optical waveguides 32 and 34.

However, with the reason that substrate material of the substrate 500 is not uniform, it is very difficult to form the substrate 500 under the condition that the phase difference is maintained at the odd number times of $\pi/2$. Accordingly, the refractive index of the optical waveguides 31 to 34 is fine adjusted with the trimming technique after the PLC substrate has been manufactured. For this fine adjustment, the fine adjusting area is locally heated. With the method explained above, it is possible to obtain a product in which the phase difference is adjusted as accurately as possible to the odd number times of $\pi/2$.

However, although it is already known that the wavelength of the receiving DQPSK modulated signal light varies within a certain range, the phase difference between the optical waveguides 31, 32 cannot be maintained to $+\pi/4$ and the phase difference between the optical waveguides 33, 34 to $-\pi/4$, even when relative phase difference in the optical coupler 60 is accurately maintained to the odd number times of π/2. Namely, quality of the receiving signal may be deteriorated.

The light path length varying unit 60 operates to prevent generation of deterioration in the quality of the receiving signal by accurately controlling this phase difference. Namely, the phase difference between the optical waveguides 31, 32 can be controlled to +π/4 and the phase difference between the optical waveguides 33, 34 can also be controlled to −π/4. Here, it is also possible that the phase difference between the optical waveguides 31, 32 is controlled to −π/4 and the phase difference between the optical waveguides 33, 34 is controlled to +π/4.

Detail operations of the embodiment of the present invention will be explained with reference to the accompanying drawings.

The DQPSK modulated signal light is guided to the optical waveguide 15 of the substrate 500 via the single mode fiber 10 or the like. The signal light is branched to two portions of signal lights (four signal lights) via the light branching parts 16, 17 from the optical waveguide 15. The branched signal lights pass the four optical waveguides 31 to 34. The optical waveguides 32, 34 pass under, for example, the thin film heater 50 for variably controlling temperature (refractive index) in the parallel condition. Moreover, the part passing under the heater among the optical waveguides 32, 34 is capable of varying refractive index of the optical waveguide with change in the temperature due to the heat of the thin film heater.

When the receiving light signal wavelength is varied, quality of the receiving signal is deteriorated because the operating points of the two interferometers are varied (phase difference is also varied). In this case, the optical waveguides of the two delay interferometers formed on the substrate 500 (optical waveguides 31, 32 and optical waveguides 33, 34) can be adjusted to provide the phase differences of −π/4 and +π/4 of the two delay interferometers with the thin film heater 50. Here, it can be assumed possible to modify the location of electrode in order to provide equal current of the thin film heater 50. As the suitable location to connect the electrodes, current distribution becomes symmetry in the vertical or horizontal directions when the center points of the vertical and horizontal directions are connected with each other. Thereby, the refractive index of each waveguide can be set almost equally. Otherwise, it is also possible to allow equal current to flow by changing thickness of the thin film heater 50.

In more practical, phase difference between the optical waveguides 31, 34 and that between the optical waveguides 32, 33 can be simultaneously and accurately adjusted with the light path length varying unit (thin film heater or the like) 50. Namely, the operating point of each delay interferometer can be controlled, based on the signal quality of the receiving DQPSK signal, for example, the bit error rate, to provide relative phase difference of +π/4 and −π/4 using the light path length varying unit.

The DQPSK modulated signal is demodulated to the intensity modulated light signal with the optical couplers 60 and becomes the complementary two light signals. The demodulated intensity modulated signal lights are converted to the electrical signals with the differential light detecting circuit 70 of the photoelectric converting unit, then amplified with the amplifier 80 and are then outputted as the signals A and B.

With the structure explained above, the operating points of the two delay interferometers can be adjusted accurately with the light path length varying unit to provide relative phase differences of +π/4 and −π/4.

Next, as an example where the present invention is adapted to the differential M-phase shift keying, an embodiment for receiving the D8PSK modulated signal light will be explained below.

First, after the intensity modulated light signal is converted to the electrical signal without change in the structure of the light receiver side, namely, correspondence between the phase difference before a symbol time of the DQPSK signal and the electrical signal output obtained by receiving the signal A (signal B) with the differential PD1 (PD2) will be indicated below.

PD1 current: positive (0 degree),
PD2 Current: positive (0 degree)
PD1 current: negative (90 degree),
PD2 current: positive (90 degree)
PD1 current: negative (180 degree),
PD2 current: negative (180 degree)
PD1 current: positive (270 degree),
PD2 current: negative (270 degree)

As indicated above, a shifting angle can be obtained with combination of the currents (voltages) of the PD1 and PD2. For example, it can be understood that the shift angle is 0 when PD1 is positive and PD2 is positive and the shift angle is 270 degrees when PD1 is positive and PD2 is negative. Based on the shift angle, the current (voltage) can be converted to the two bits of the digital value.

Subsequently, an example of D8PSK will be explained below. In the case of D8PSK, the shift angle is required to be identified for every 45 degrees. Relationship between the shift angle and current is as follows.

PD1 current: positive (0 degree),
PD2 current: positive (0 degree)
PD1 current: 0(zero) (45 degree),
PD2 current: positive (45 degree)
PD1 current: negative (90 degree),
PD2 current: positive (90 degree)
PD1 current: negative (135 degree),
PD2 current: 0(zero) (135 degree)
PD1 current: negative (180 degree),
PD2 current: negative (180 degree)
PD1 current: 0(zero) (225 degree),
PD2 current: negative (225 degree)
PD1 current: positive (270 degree),
PD2 current: negative (270 degree)
PD1 current: positive (315 degree),
PD2 current: 0(zero) (315 degree)

The D8PSK signal can be demodulated by identifying the three values (positive, 0, negative) for the PD1 and PD2 detected as explained above. Moreover, the differential M-phase shift keying signal (M=2n) can be received by providing a multivalue discriminator for the receiving current as in the case of the D16PSK or higher.

Second Embodiment

FIG. 1(B) illustrates a modification example of the optical receiver as the first embodiment (FIG. 1A) of the present invention. This embodiment is different from the first embodiment in the point that the optical waveguides 31 and 32 in the first embodiment are arranged asymmetrically on the substrate and the light path length varying unit 50 is arranged diagonally to the fiber 10.

Namely, two optical waveguides are arranged asymmetrically and the heater can be arranged diagonally. Particularly, this arrangement is useful when there are limitations on the mounting method and influence of temperature.

Third Embodiment

FIG. 1(C) illustrates a modification example of the optical receiver as the first embodiment (FIG. 1A) of the present invention. In the first and second embodiments, the light path length varying unit for phase adjustment has been provided to the relative delay optical waveguides 32, 33 corresponding to a symbol. However, this embodiment is different in the point that the light path length varying unit 50 is arranged to the other optical waveguides 31, 34. With this arrangement, the thin film heater, for example, can be arranged in the longer length. Particularly, this structure is useful when sufficient reduction in size is realized and thereby the operating points of the two delay interferometers cannot easily provide the light path difference of $+\pi/4$ and $-\pi/4$ as the relative phase difference explained above through the control of the light path length varying unit 50.

Fourth Embodiment

In the fourth to seventh embodiments explained below, the delay interferometers of two systems are provided on one chip (substrate) and the MMI coupler is also used. Moreover, the optical waveguides are arranged symmetrically in the right and left sides of the center line.

Figure 2:
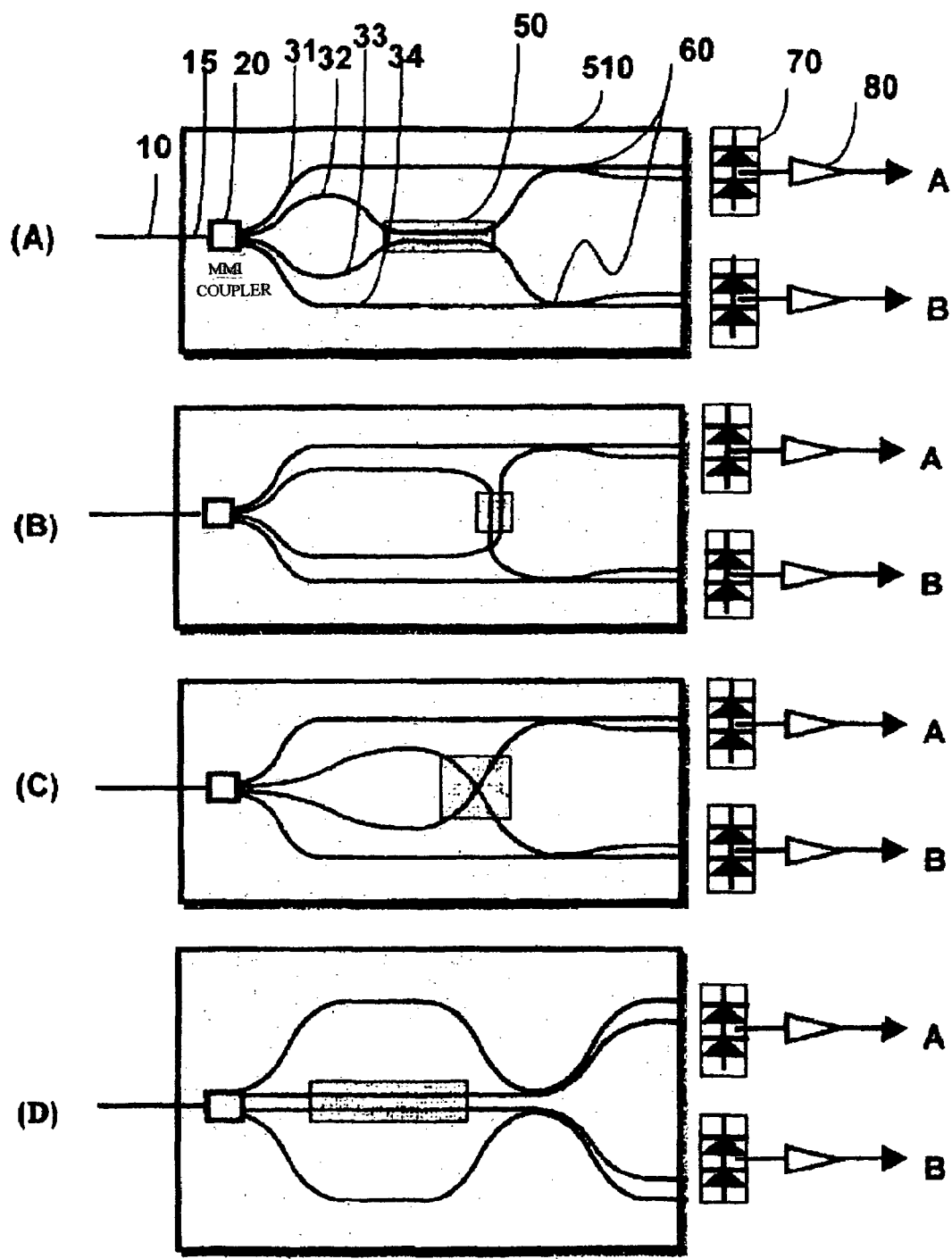
FIG. 2 are diagrams illustrating structures of the optical receiving apparatus as the fourth to seventh embodiments of the present invention.

FIG. 2(A) illustrates a modification example of the optical receiver as the first embodiment (FIG. 1A) of the present invention. In FIG. 1(A) illustrating the first embodiment of the present invention, the numerals 31 to 34 denote the optical waveguides and the signal lights having four almost identical powers are branched, with the light branching units 16, 17, to the optical waveguides 31 to 34. In order to branch the light beams into four signal lights of identical power, three light branching units are required. Accordingly, the number of components increases, light path length becomes longer, and thereby a problem rises in reduction in size.

In this embodiment, the DQPSK signal light inputted to the MMI coupler (multimode interference coupler) 20 from the single mode fiber 10 is branched at least into four signal lights of almost identical powers. Use of the MMI coupler in this embodiment can reduce the number of light branching units to one (1) from three (3). Moreover, since the light path length to obtain four signal lights can be shortened, further reduction in size can be realized. Details of the MMI coupler will be explained later.

Fifth Embodiment

FIG. 2(B) is a block diagram illustrating a modification example of the optical receiver as the fourth embodiment (FIG. 2A) of the present invention.

This embodiment is different in the point that the optical waveguides 32 and 33 are crossing with each other in the substrate 500 and the thin film heater 50 is arranged almost at the right angle to the fiber 10.

Namely, the light path length varying unit 50 can be arranged almost at the right angle to the single mode fiber by providing the two optical waveguides to respectively pass in the opposite directions under the light path length varying unit 50. With such arrangement of optical waveguides, design options for arranging the thin film heater 50 or the like can be increased.

Sixth Embodiment

FIG. 2(C) is a block diagram illustrating a modification example of the optical receiver as the fifth embodiment (FIG. 2B) of the present invention. This embodiment is different in the point that the optical waveguides 32 and 33 are gradually crossing with each other under the light path length varying unit 50. Moreover, the length of the optical waveguides 32, 33 passing under the thin film heater 50 can be increased by allowing at least two corners of the thin film heater 50 to overlap with the underlying optical waveguides 32, 33.

Seventh Embodiment

FIG. 2(D) is a block diagram illustrating a modification example of the optical receiver as the fourth embodiment (FIG. 2A) of the present invention. In this embodiment, the optical waveguides 33, 34 are provided linearly and the optical waveguides 31, 34 are curved in order to obtain relative delay time difference corresponding to a symbol duration of the DQPSK modulated signal. In this embodiment, since length of the linear parts of the optical waveguides 32, 33 passing under the thin film heater 50 can be increased, comparatively large change of light path can be attained only with small change in temperature.

Eighth Embodiment

In the fourth to seventh embodiments, the two delay interferometers are provided on one chip (substrate) and the MMI coupler is used. Moreover, the thin film hater or the like are arranged symmetrically with respect to the center lines.

Figure 3:
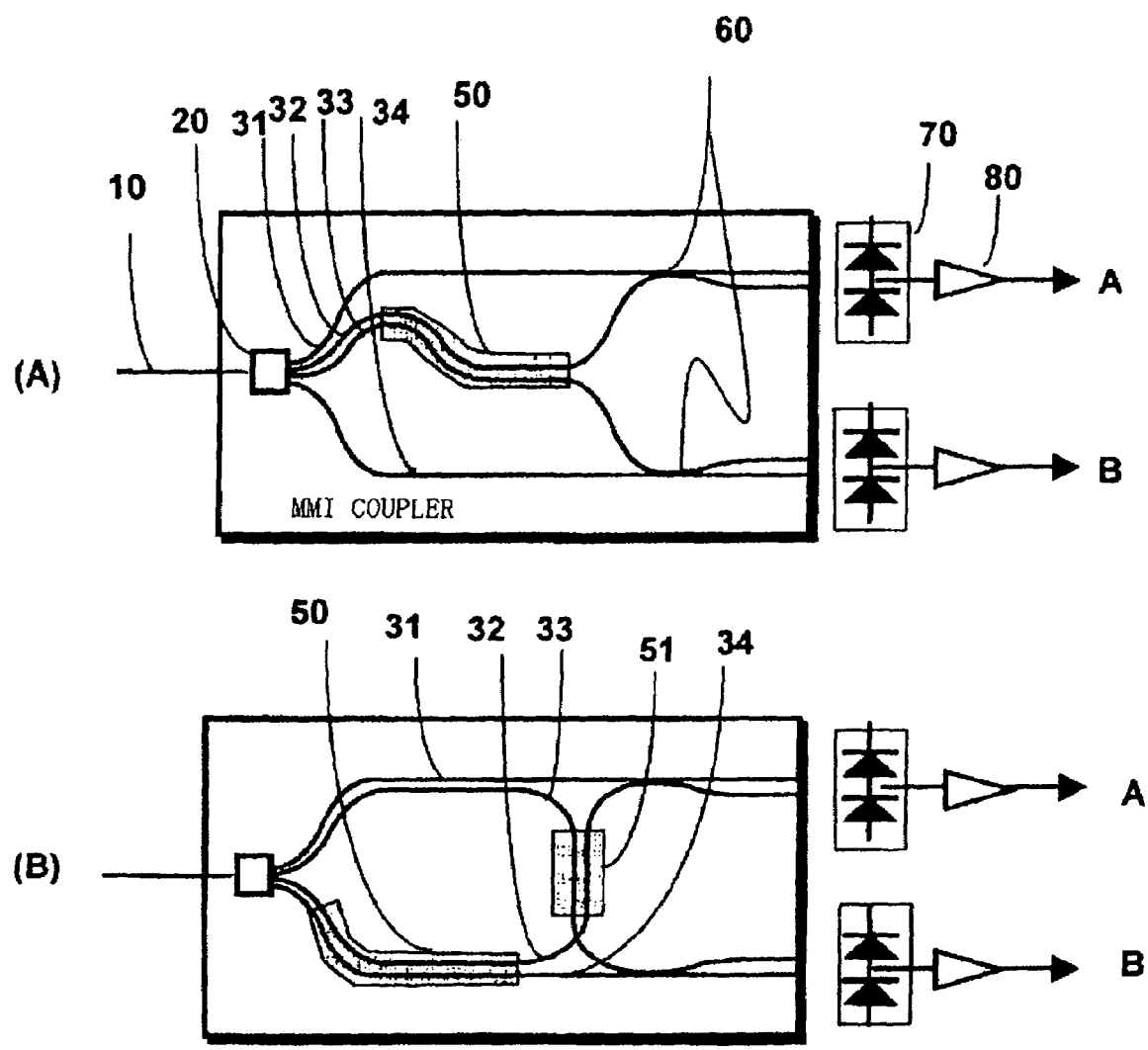
FIG. 3 are diagrams illustrating structures of the optical receiving apparatus as the eighth to ninth embodiments of the present invention.

FIG. 3(A) is a block diagram illustrating a modification example of the optical receiver as the seventh embodiment (FIG. 2D) of the present invention. In this embodiment, relative delay time difference corresponding to a symbol duration of the DQPSK modulated signal can be obtained by providing linearly the optical waveguides 31, 34 and curving the optical waveguides 32, 33. In this embodiment, the optical waveguides 32, 33 are arranged as a pair of curves and are also arranged asymmetrically with respect to the center line. With the arrangement explained above, different length of light path can be obtained and the distance for arranging the thin film heater can be elongated because the optical waveguides are curved gradually. This structure is effective for making longer the change in the light path length.

Ninth Embodiment

FIG. 3(B) is a block diagram illustrating a modification example of the optical receiver as the fifth embodiment (FIG. 2(C)) of the present invention. In this embodiment, relative delay time difference corresponding to a symbol duration of the DQPSK modulated signal can be obtained by providing linearly the optical waveguides 31, 34 and curving the optical waveguides 32, 33. Moreover, in this embodiment, the optical waveguides 32, 33 are arranged as a pair of curves and arranged symmetrically to the center line. With arrangement explained above, an optical path length can be attained. Moreover, the phase difference between the optical waveguides 31, 32 can be controlled to $+\pi/4$ and the phase difference between the optical waveguides 33, 34 to $-\pi/4$ by changing the refractive index of the optical waveguides using the thin film hater 50.

In this embodiment, light path length which may be changed can be increased by electrically connecting in series or in parallel an additional thin film hater 51 to the thin film heater 50. With such arrangement in which the heater is arranged in longer length, range of change in temperature can be narrowed and generation of change by aging and stress at a local area can be reduced.

Tenth Embodiment

For example, it is well known that if transmission format (SONET/SDH, OTN or the like) is different even when the transmission rate of payload is identical, communication rate (Baud Speed) is different. This means that the time required for transmission of a symbol (code) is different a little because of difference in header size and FEC redundancy. Namely, when the DQPSK modulated signal light is demodulated to the intensity modulated signal with the delay interferometer, the Q value of the light signal to be modulated is different in accordance with setting of the communication rate of the free spectral range (FSR) of this delay interferometer.

The best means for setting such communication rate is that length of the optical waveguides for giving delay corresponding to a symbol of the communication rate used is varied in accordance with the communication rate. However, it is difficult for the present technique to form the variable length optical waveguides for delay interference on the silica substrate or the indium phosphide substrate.

Following two communication rates may be thought as the examples of the communication rates of multirate supporting the present 40 Gbps.
19.9 Gbaud (Giga Baud) symbol time ($\tau$) 50.25 ps
21.98 Gbaud symbol time ($\tau$) 45.5 ps In the case of receiving the signal light in different two or more communication rates, or in the case of receiving the signal light in the communication rate matched with 19.9 Gbaud, the reception quality of the communication rate at 21.98 Gbaud may be deteriorated. Accordingly, in order to maintain the identical Q value when a client changes, for example, the apparatus to be connected to OTN from SONET, it is desirable that the free spectral range of the delay interferometer provided to the optical receiving apparatus is set to the desirable value.

In this embodiment, it is intended to provide a multirate optical receiver in almost the identical client data transmission rate. In view of supporting multirate in this embodiment, the delay times of the first delay interferometer and second delay interferometer are not matched with the communication rate, but to almost intermediate communication rate of the maximum and minimum communication rates. In more practical, the result that the Q value reduction by 0.6 dB can be obtained through the simulation in the case where the communication rate of a single arm of the delay interferometer is set to 19.9 Gbaud in the DQPSK system and the optical receiver has received the signal light in the rate of 21.98 Gbaud. Meanwhile, when the operating point of the delay interferometer is set to almost the intermediate rate between the maximum and the minimum communication rates, the Q value reduction is about 0.3 dB in the 19.9 Gbaud and 21.98 Gbaud.

The inventors of the present invention have found that this simulation result assures that the reception quality is a little deteriorated but the signal light can be received in the stable condition even when the operating point of the delay interferometer is set to 19.9 Gbaud and when the communication rate is set to 21.98 Gbaud.

Moreover, in the other embodiment, because of such technical background, deviation of reception quality can be reduced at the minimum communication rate and the maximum communication rate when the operating point of the delay interferometer is set within the range of the communication rate of ±15% from almost the center of the communication rate in the maximum and minimum communication rates.

Figure 4:
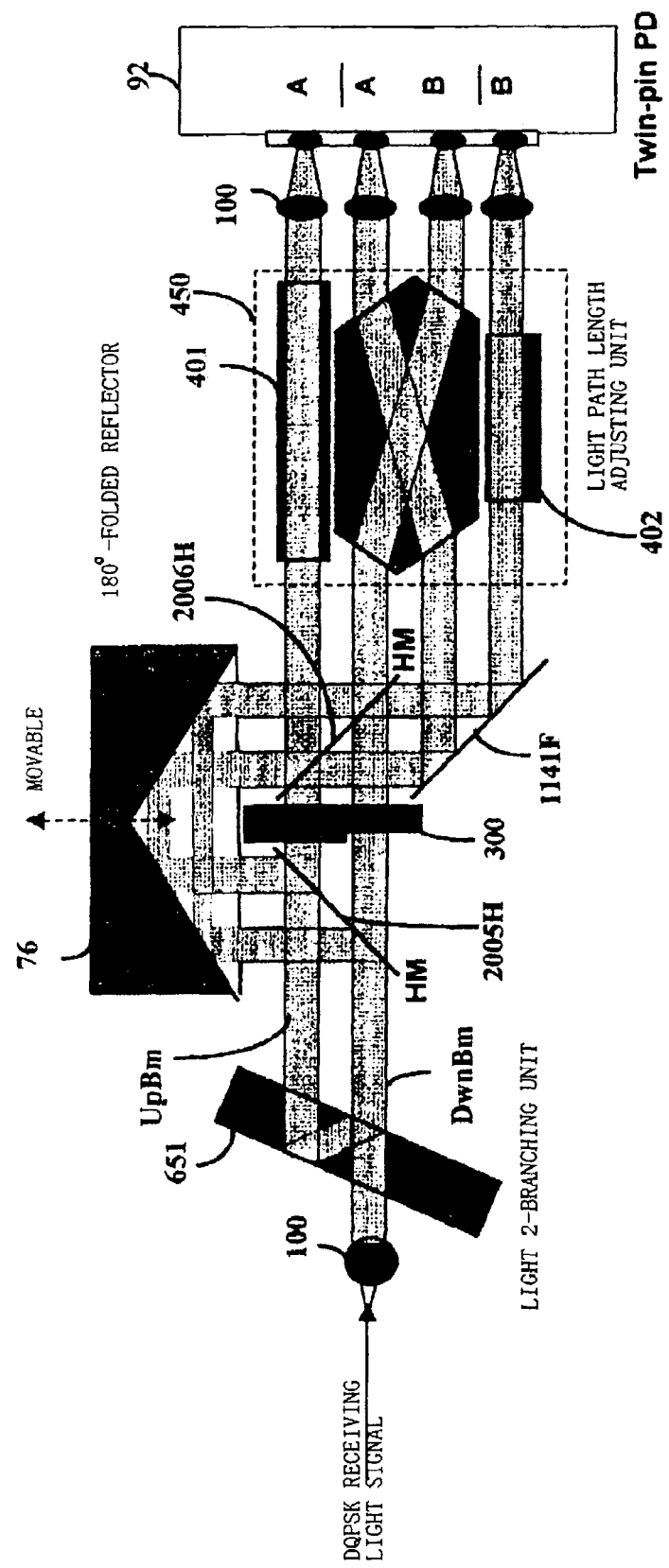
FIG. 4 is a diagram illustrating a structure of the optical receiving apparatus as a tenth embodiment of the present invention.
Figure 5:
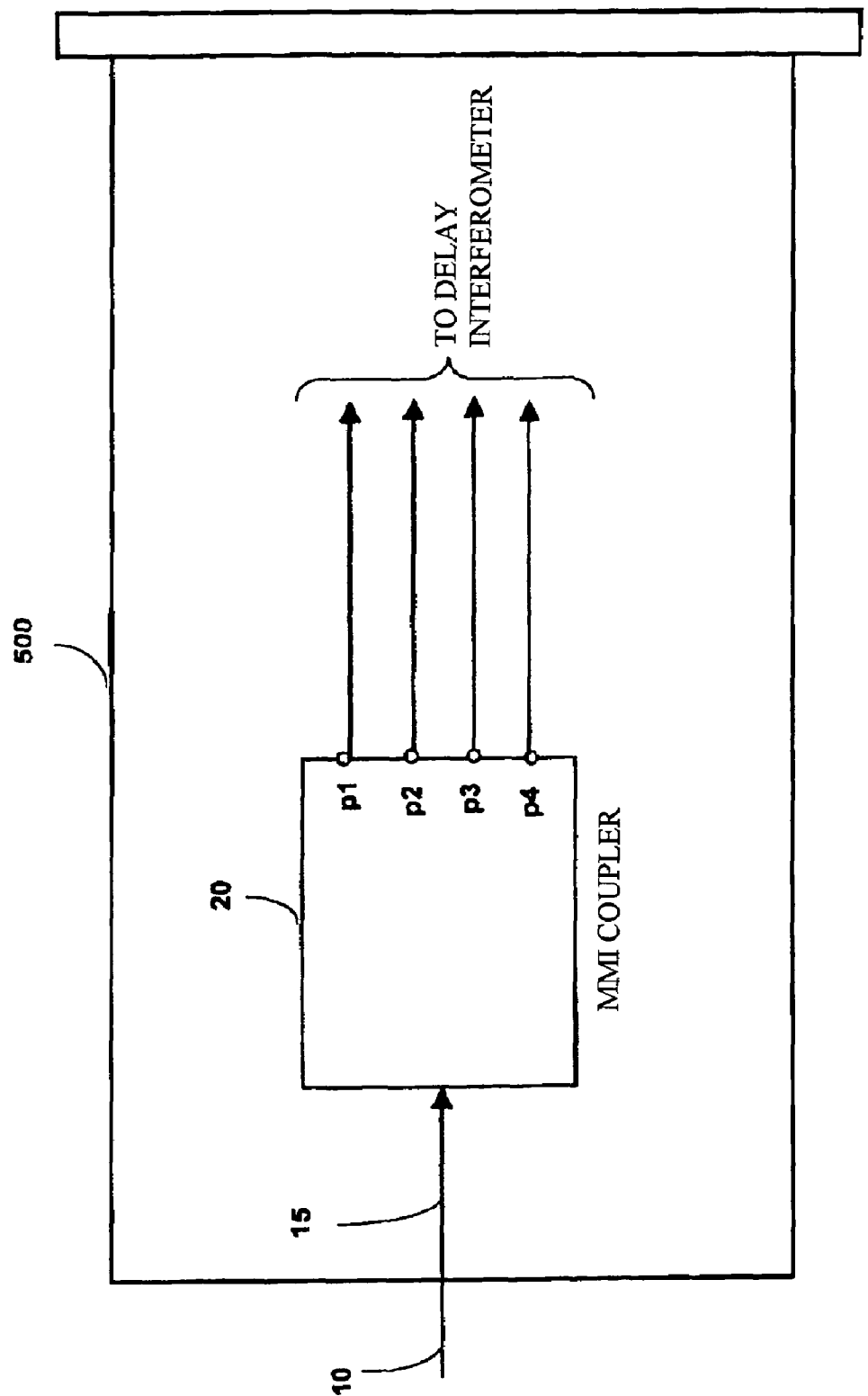
FIG. 5 is a diagram illustrating a structure of an MMI coupler of the present invention.
Figure 6:
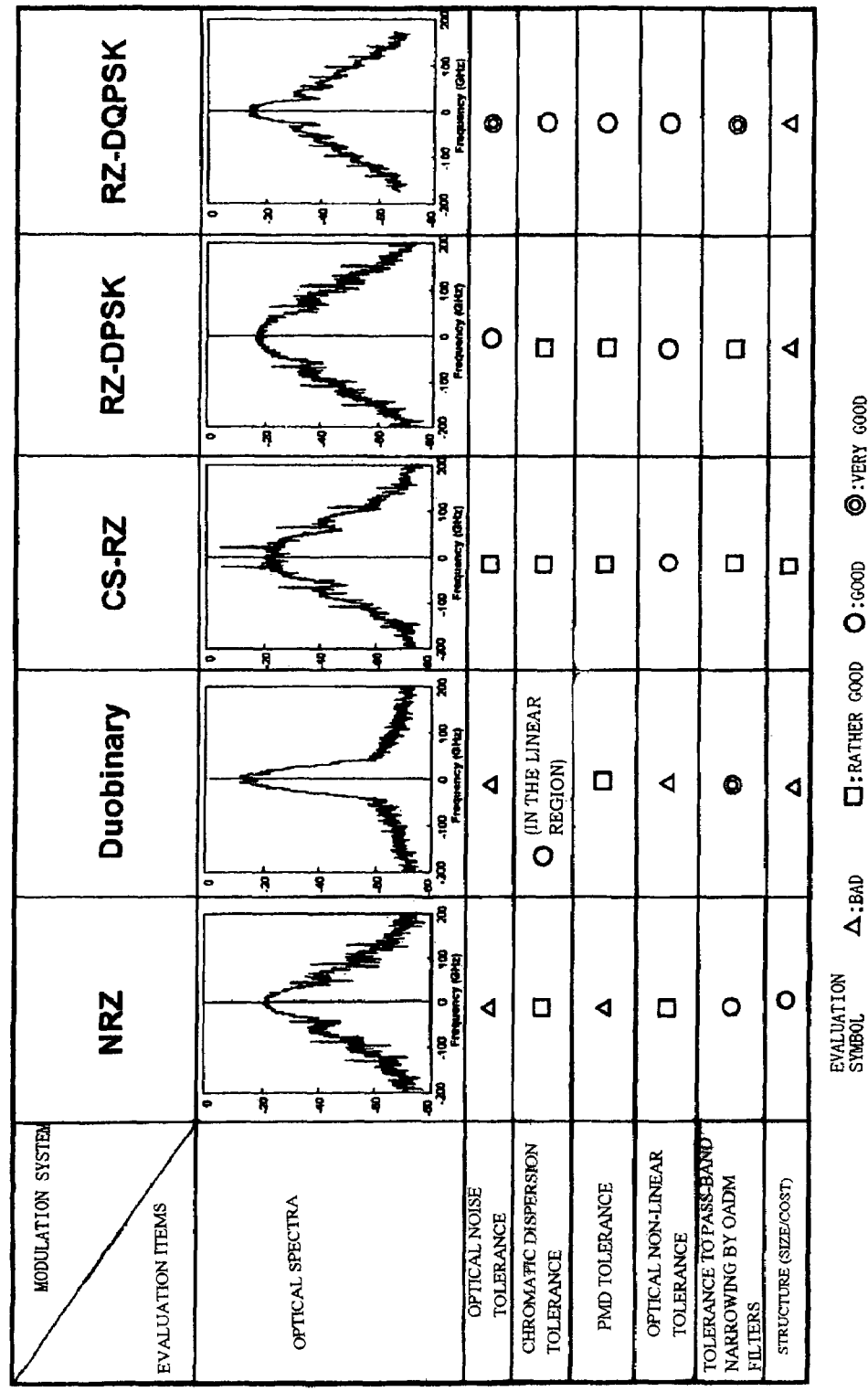
FIG. 6 is a diagram illustrating characteristics of the modulation systems of light signals.
Figure 7:
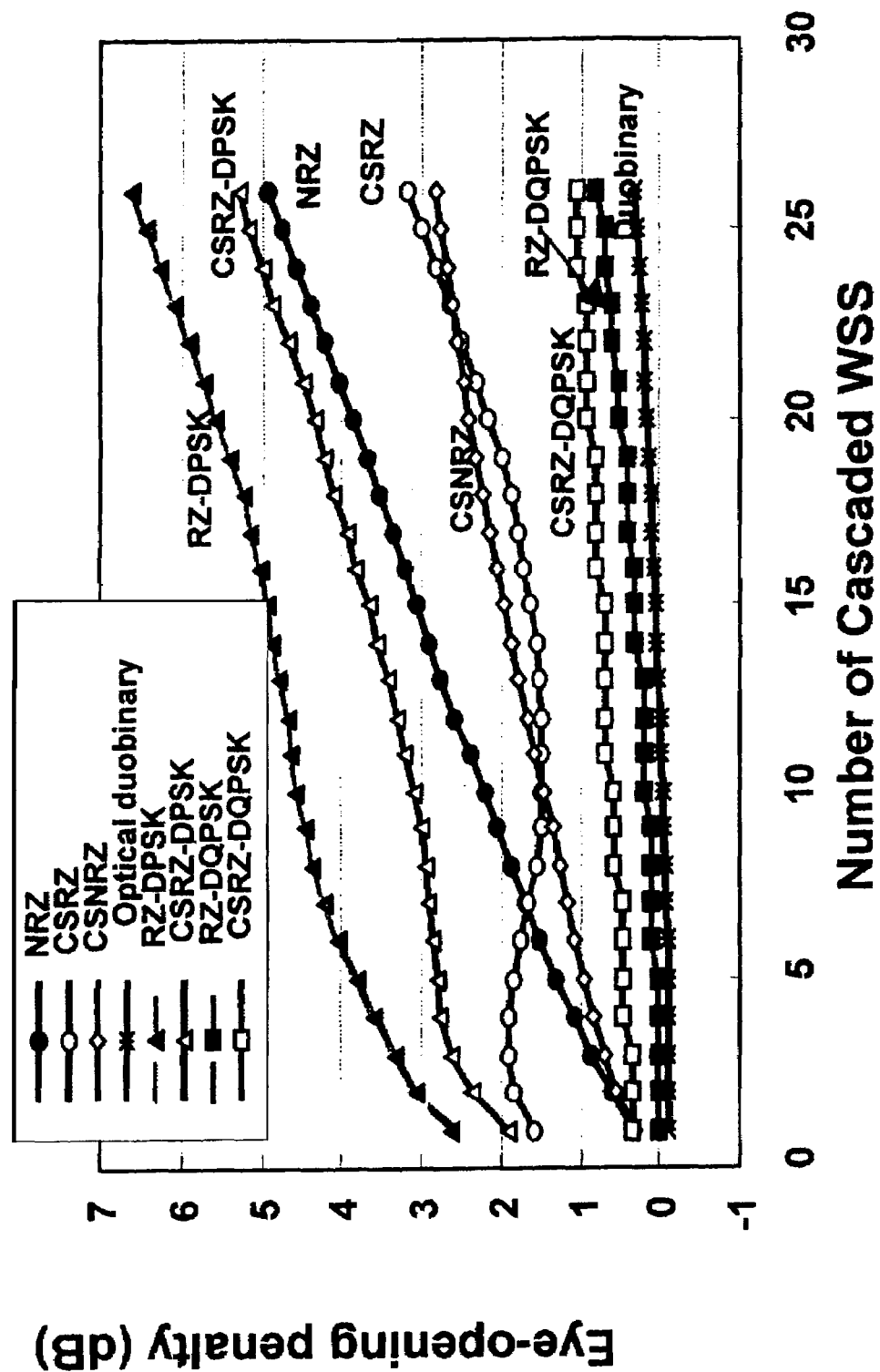
FIG. 7 is a diagram illustrating simulation result for passing tolerance of concatenated wavelength branching/combining filters (for example, OADMs).
Figure 8:
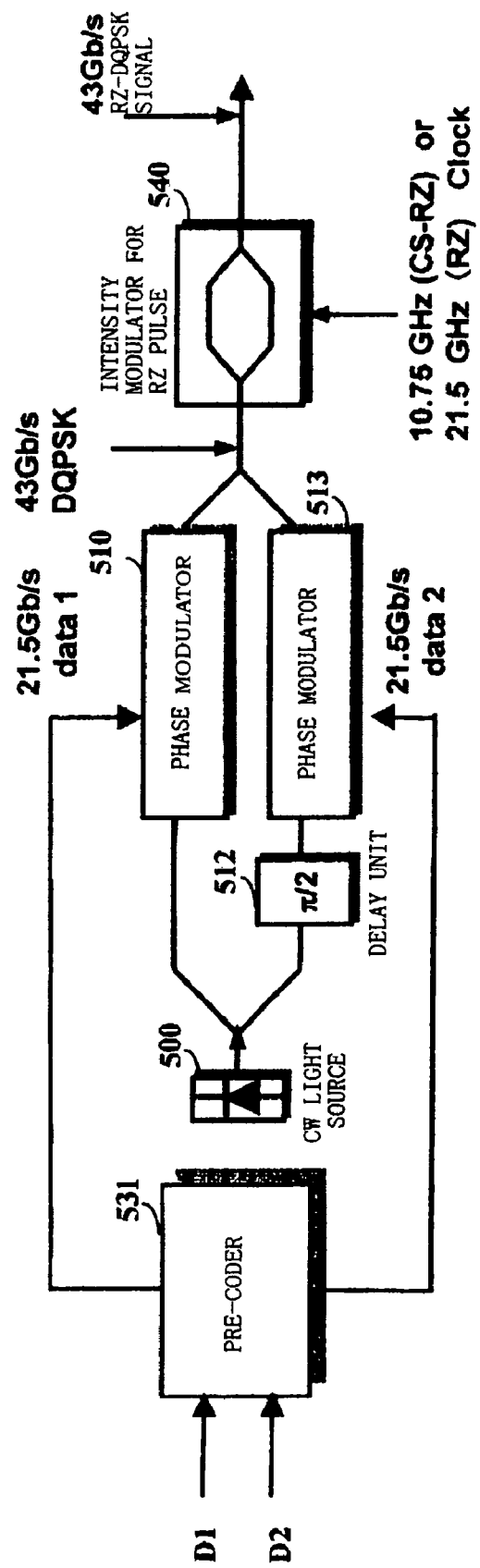
FIG. 8 is a diagram illustrating an example of structure of the background art of the DQPSK optical transmitting apparatus.
Figure 9:
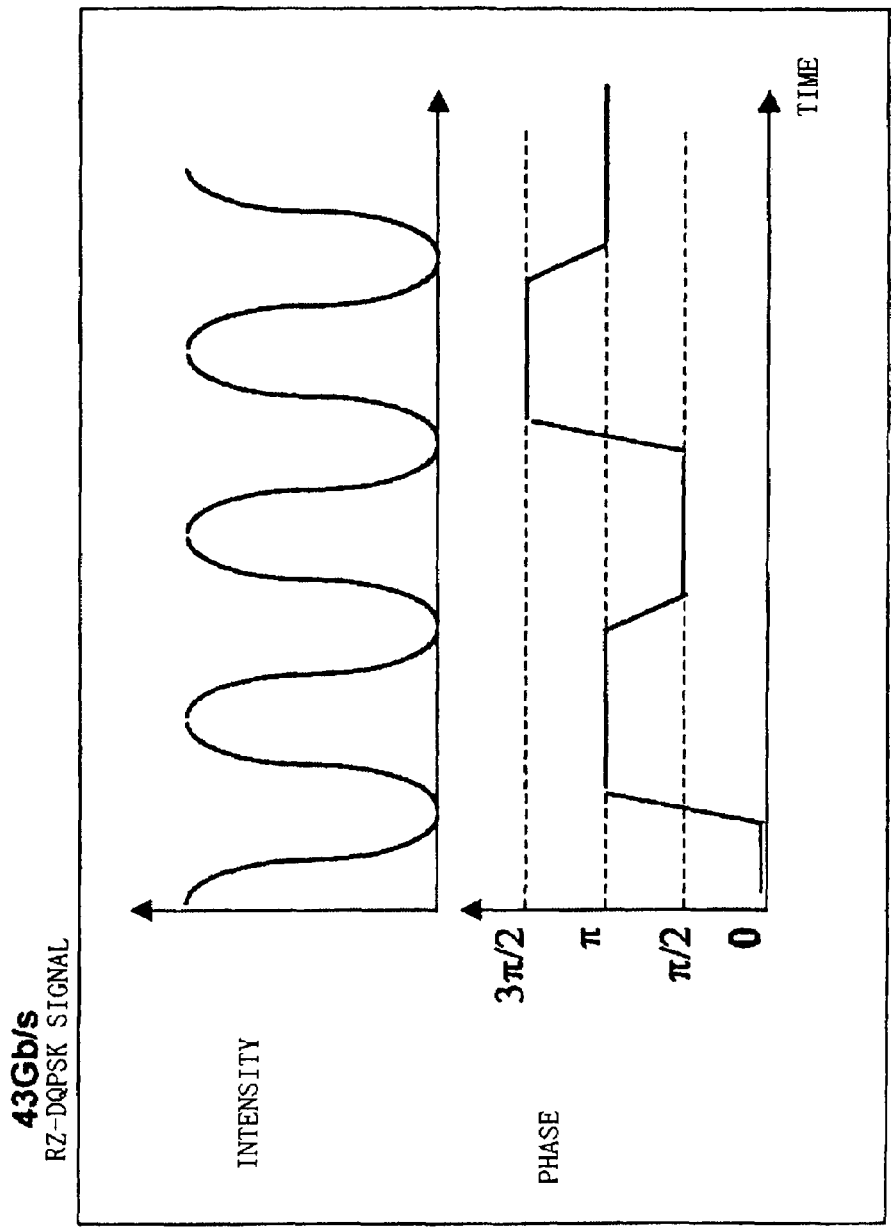
FIG. 9 is a diagram illustrating phase and intensity waveforms of the RZ-DQPSK light signal.
Figure 10:
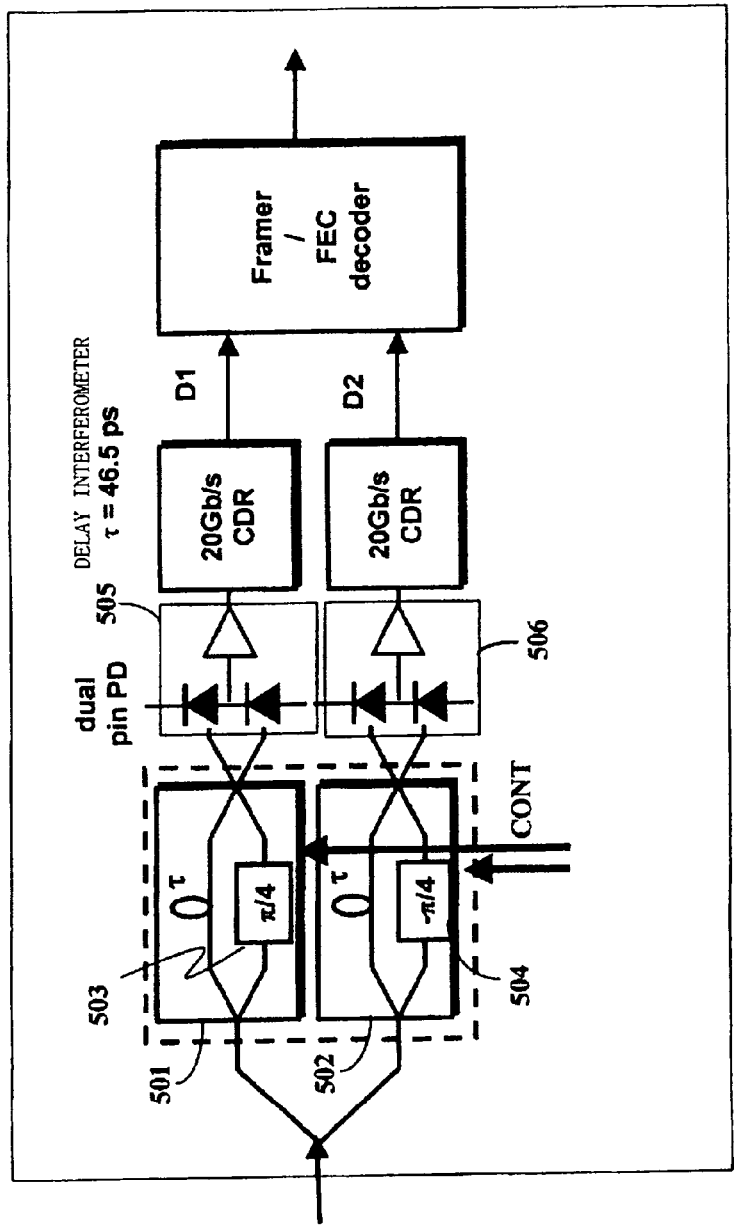
FIG. 10 is a diagram illustrating an example of structure of the background art of the DQPSK optical transmitting apparatus.

Moreover, the embodiments of the present invention can also be adapted to an embodiment of the bulk optics system of FIG. 4. Accordingly, it is possible to provide a multirate optical receiver by setting, for the operation, the operating points of two delay interferometers between the minimum and maximum communication rates. It is possible for two delay interferometers to set independently the operating points.

The tenth embodiment of FIG. 4 is an example of modifications of the ninth embodiment. Explanation will be made by paying attention to the changing points.

In this embodiment, the DQPSK modulated signal received by the single mode fiber is branched to four signal lights (two pairs of signal lights) with the light branching part 651 and half-mirror 2005H. The light path length varying unit is formed of the folded reflector 76 and the phase difference plate 300. One pair of signal lights of two pairs (four signals) is inputted to the half-mirror 2006H after reflection by the folded reflector 76. The other pair of two pairs of signal lights is then inputted to the half-mirror 2006H after passing the half-mirror 2005H and phase difference plate 300. Due to difference between the light path length up to the half-mirror 2005H, folded reflector 76 and half-mirror 2006H and the light path length up to the half-mirror 2006H from the half-mirror 2005H, one pair of two pairs of signal lights is controlled to generate relative delay time difference corresponding to approximately a symbol duration of the DQPSK modulated signal and the signal light wavelength phase difference between two pairs of signal lights can be set the odd number times of almost $\pi/2$ with the phase difference plate 30. The one pair of signal lights and the other pair of signal lights are interfered with each other to demodulate the intensity modulated light signals.

However, since each light path to each light detecting element from the half-mirror 2006H is different, adjustment is necessary for equalizing the light path length. The light path length adjusting unit 450 is formed of an optical system and the optical system is produced to provide almost equal propagation time up to each light receiving element. Since the demodulated light signal passes through such optical system, the complementary two pairs of light signals A, complementary light signal A, light signal B, and complementary light signal B can be converted to the electrical signals with the differential light detecting circuit.

This embodiment provides a merit that the number of component is rather small, cost and size reduction is realized and the number of adjusting points is reduced. Moreover, since the input and output are on the opposite sides, reduction in size and cooperation with the other apparatus are ensured from the viewpoint of the mounting.

As explained above, the delay interferometers of two systems have the period of FSR (Free Spectral Range) in which level of the output signal changes in accordance with the interference wavelength (phase difference).

The embodiment of the present invention is intended to provide the multirate optical receiver in the almost identical client data transmission rate. In view of supporting the multirate operation, the delay times of first and second delay interferometers are not matched with the communication rate in the embodiment of the present invention but deviation of multirate reception quality is reduced by setting the communication rate to almost the intermediate value between the maximum and minimum communication rates. In more practical, the result that the Q value is reduced by 0.6 dB can be obtained with the simulation in the case where the light signal is received with the optical receiver in the rate of 21.98 Gbaud by setting the communication rate of the single arm of the delay interferometer is set to 19.9 Gbaud in the DQPSK modulation system. Meanwhile, when the operating point of the delay interferometer is set to almost the intermediate value of the maximum and the minimum communication rates, the Q value is attenuated by almost 0.3 dB at the 19.9 Gbaud and 21.98 Gbaud.

Moreover, the embodiment of the present invention can also be adapted to an embodiment of the bulk optics system. Therefore, it is possible to provide a multirate optical receiver which may be operated in any of the operating point of the delay interferometer in the range up to 80% from the center among the minimum and maximum communication rates. Namely, when the minimum and maximum communication rates are set respectively to 19.9 Gbaud and 21.98 Gbaud, a rate difference of 2.08 Gbaud is generated. In such different communication rates, the multirate optical receiver having small deviation in the reception quality can be provided by setting the operating point (for example, 20.88 Gbaud to 21.25 Gbaud) of the delay interferometer to the value within the range of 80% (for example, within the range of 19.9+2.08*0.35 to 21.98−2.08*0.35) among the minimum and maximum communication rates in such different communication rates.

In the other embodiment, one of two delay interferometers may be set in its operating point of interference to the maximum communication rate and the operating point of other delay interferometer may also be set to the lowest communication rate.

With the setting explained above, the total communication quality can be improved with the FEC (Forward Error Correction).

[Fabrication of MMI Coupler]

The signal light inputted to the MMI (Multimode Interference) coupler progresses while it is widely spreading in the multimode optical waveguide. During the propagation, the signal light is totally reflected with the horizontal and vertical walls. As a result, according to the experiment, the optical power is focused to a plurality of points, although, depending on the shape of optical waveguides.

A tool for three-dimensional simulation by inputting, as the parameters of the job, an optical waveguide and a refractive index to the MMI coupler design software has been available in the market. For example, the OptiBPM by the OptiWave Corporation (Canada) is well known. According to the manual of this tool, a simplified MMI coupler can be produced by inputting parameters from the menu. The four signal lights can be extracted by identifying the four signal light centralized points (p1, p2, p3, p4) in the distance (d) calculated from the input position and then coupling these four points to the output ports (L1, L2, L3, L4) of the four single mode optical waveguides 20.

The invention claimed is:

1. An optical receiving apparatus, comprising:
   first and fourth optical waveguides;
   second and third optical waveguides giving relative delay time differences corresponding to a symbol of a differential M-phase shift keying modulated signal for the first and fourth optical waveguides, respectively;
   a branching unit supplying almost equal powers branched from input signal light inputted to the first to fourth optical waveguides;
   a demodulating unit demodulating at least two light signals through interference of signal lights between said first to second optical waveguides and between said third to fourth optical waveguides;
   at least two optical detectors converting at least two light signals from said demodulating unit into electrical signals; and
   a light path length varying unit varying each light path length of two optical waveguides being arranged through selection of combinations of said first and third optical waveguides, said first and fourth optical waveguides, and said second and third optical waveguides in a region when the wavelength of said signal light is varied, wherein
   operating points of two delay interferometers are set to a predetermined communication rate, between a minimum communication rate and a maximum communication rate of multi-rate communication, based on the relative delay time differences corresponding to a symbol duration of said symbol.

2. The optical receiver according to claim 1, wherein said second and the third optical waveguides are arranged symmetrically passing under said light path length varying unit.

3. The optical receiver according to claim 1, wherein said first and fourth light paths are arranged passing under said light path length varying unit as the optical waveguides which are not given the relative delay time difference corresponding to a symbol duration.

4. The optical receiving apparatus according to claim 1, wherein said branching unit is a multimode interference coupler.

5. The optical receiver according to claim 4, wherein said second to third light paths arranged within said light path length varying unit are light paths which are given relative delay time difference corresponding to a symbol duration and are arranged resulting in opposing passing direction of signal lights under said light path length varying unit.

6. The optical receiver according to claim 4, wherein said second and third light paths arranged within said light path length varying unit are light paths which are given relative delay time difference corresponding to a symbol duration and are arranged resulting in opposite crossing in the passing direction of each signal light at under said light path length varying unit.

7. The optical receiver according to claim 4, wherein said first and fourth light paths arranged in said light path length varying unit are light paths which are not given relative delay time difference corresponding to a symbol duration and are arranged passing under said light path length varying unit.

8. The optical receiver according to claim 4, wherein said second and third light paths arranged in said light path length varying unit are light paths which are given relative delay time difference corresponding to a symbol duration and are arranged passing on a curve under said light path length varying unit.

9. The optical receiver according to claim 1, wherein said light path length varying unit includes said first and third light paths or said second and fourth light paths arranged which are optical waveguides given relative delay time difference according to a symbol duration of the modulated signal and not given such relative delay time difference and are arranged passing under said light path length varying unit.

10. An optical receiving apparatus comprising, a branching unit for supplying signal lights of almost equal power obtained by branching an input light, a delay adjusting unit for giving relative delay time difference according to a symbol duration of the differential M-phase shift keying modulated signal to a first signal light and a fourth signal light, a demodulating unit for demodulating at least two light signals through interference of respective signal lights of the first and second signal lights and the third and fourth signal lights, and at least two light detectors for converting said at least two light signals from said demodulating unit into electrical signals, wherein operating points of two delay interferometers are set to a predetermined communication rate, between a minimum communication rate and a maximum communication rate of multi-rate communication, based on a relative delay time difference corresponding to symbol duration of said input light wavelength in said delay adjusting unit.

11. The optical receiver according to claim 1, further comprising a heater that commonly heats parts of the second and third optical waveguides that are a same length.

12. An optical apparatus, comprising:

a plurality of interferometers, each interferometer having a plurality of interferometer arms with different optical path lengths;

a branching unit coupling the plurality of interferometers or the arms of the plurality of interferometers; and an optical coupler coupling the plurality of interferometers, wherein operating points of the plurality of interferometers are set to a predetermined communication rate, between a minimum communication rate and a maximum communication rate of multi-rate communication, based on the relative delay time differences corresponding to symbol duration of a symbol of a differential M-phase shift keying modulated signal.

13. The optical apparatus according to claim 12, further comprising an MMI coupler coupling the arms of an end of the plurality of interferometers.

14. The optical apparatus according to claim 12, further comprising a heater that commonly heats parts of the plurality of interferometers that are a same length.

* * * * *

UNITED STATES PATENT AND TRADEMARK OFFICE
CERTIFICATE OF CORRECTION

PATENT NO. : 7,606,504 B2
APPLICATION NO. : 11/397690
DATED : October 20, 2009
INVENTOR(S) : Hiroshi Onaka It is certified that error appears in the above-identified patent and that said Letters Patent is hereby corrected as shown below:

Column 15, Line 18, change "to" to --to a--.

Column 16, Line 13, change "to" to --to a--.

Signed and Sealed this

Nineteenth Day of January, 2010

David J. Kappos
*Director of the United States Patent and Trademark Office*